(12) United States Patent
Aubert (10) Patent No.: US 11,586,770 B2
(45) Date of Patent: Feb. 21, 2023

(54) ACCESS RESTRICTION FOR PORTIONS OF A WEB APPLICATION

(71) Applicant: EMC IP Holding Company LLC, Hopkinton, MA (US)

(72) Inventor: Raphaël Aubert, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 366 days.

(21) Appl. No.: 16/776,892

(22) Filed: Jan. 30, 2020

(65) Prior Publication Data
US 2021/0240843 A1   Aug. 5, 2021

(51) Int. Cl.
| | |
|---|---|
| *G06F 16/93* | (2019.01) |
| *G06F 21/62* | (2013.01) |
| *G06F 16/957* | (2019.01) |
| *G06F 16/953* | (2019.01) |
| *G06F 16/955* | (2019.01) |
| *G06F 16/954* | (2019.01) |

(Continued)

(52) U.S. Cl.
CPC ............ *G06F 21/629* (2013.01); *G06F 16/94* (2019.01); *G06F 16/953* (2019.01); *G06F 16/954* (2019.01); *G06F 16/9535* (2019.01); *G06F 16/9566* (2019.01); *G06F 16/9577* (2019.01); *G06F 40/134* (2020.01)

(58) Field of Classification Search
CPC ...... G06F 21/629; G06F 16/94; G06F 16/953; G06F 16/9535; G06F 16/954; G06F 16/9566; G06F 16/9577; G06F 40/134; G06F 16/90; G06F 16/80; G06F 40/00
See application file for complete search history.

(56) References Cited

U.S. PATENT DOCUMENTS

| | | | |
|---|---|---|---|
| 2003/0020746 A1* | 1/2003 | Chen | G06F 16/972 715/741 |
| 2003/0154239 A1 | 8/2003 | Davis et al. | |
| 2007/0147306 A1 | 6/2007 | Halpern | |

(Continued)

OTHER PUBLICATIONS

Michael Geers, "Micro Frontends—Extending the Microservice Idea to Frontend Development," https://micro-frontends.org/, downloaded Sep. 30, 2019, 6 pages.

(Continued)

*Primary Examiner* — Sanchita Roy
(74) *Attorney, Agent, or Firm* — Ryan, Mason & Lewis, LLP (57) ABSTRACT

An apparatus includes at least one processing device configured to receive, from a user, a request to execute a web application. The web application utilizes a plurality of web application portions configured for loading into the web application independent of one another. The at least one processing device is also configured to send, to one or more web application servers, a query for metadata associated with the plurality of web application portions, and to receive, from the web application servers, metadata for a subset of the plurality of web application portions. The subset is determined based at least in part on access rights associated with the user. The at least one processing device is further configured to load instances of one or more of the subset of web application portions at specified locations in pages of the web application based at least in part on the received metadata.

20 Claims, 8 Drawing Sheets

(51) Int. Cl.
   *G06F 16/9535*   (2019.01)
   *G06F 40/134*    (2020.01)

(56) References Cited

U.S. PATENT DOCUMENTS

| | | |
|---|---|---|
| 2011/0145360 A1 | 6/2011 | Sheshagiri et al. |
| 2012/0166963 A1 | 6/2012 | Kohli et al. |
| 2016/0285958 A1 | 9/2016 | Das et al. |
| 2018/0052811 A1* | 2/2018 | Gonzalez del Solar .................... G06F 16/258 |
| 2019/0266225 A1* | 8/2019 | Solis ................... G06F 16/2246 |
| 2020/0351382 A1* | 11/2020 | Currier ............... G06F 16/9577 |

OTHER PUBLICATIONS

U.S. Appl. No. 16/673,052 filed in the name of Raphaël Aubert filed Nov. 4, 2019, and entitled "Using Web Application Components with Different Web Application Frameworks in a Web Application."

U.S. Appl. No. 16/588,168 filed in the name of Raphaël Aubert filed Sep. 30, 2019, and entitled "Migration of Web Applications between Different Web Application Frameworks."

* cited by examiner

ACCESS RESTRICTION FOR PORTIONS OF A WEB APPLICATION

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for enabling access restriction for portions of web applications.

In one embodiment, an apparatus comprises at least one processing device comprising a processor coupled to a memory. The at least one processing device is configured to perform the step of receiving, from a user, a request to execute a web application, the web application utilizing a plurality of web application portions, the plurality of web application portions being configured for loading into the web application independent of one another. The at least one processing device is also configured to perform the step of sending, to one or more web application servers, a query for metadata associated with the plurality of web application portions. The at least one processing device is further configured to perform the step of receiving, from the one or more web application servers, metadata for a subset of the plurality of web application portions, the subset of the plurality of web application portions being determined based at least in part on access rights associated with the user. The at least one processing device is further configured to perform the step of loading instances of one or more of the subset of the plurality of web application portions at specified locations in one or more pages of the web application based at least in part on the received metadata.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
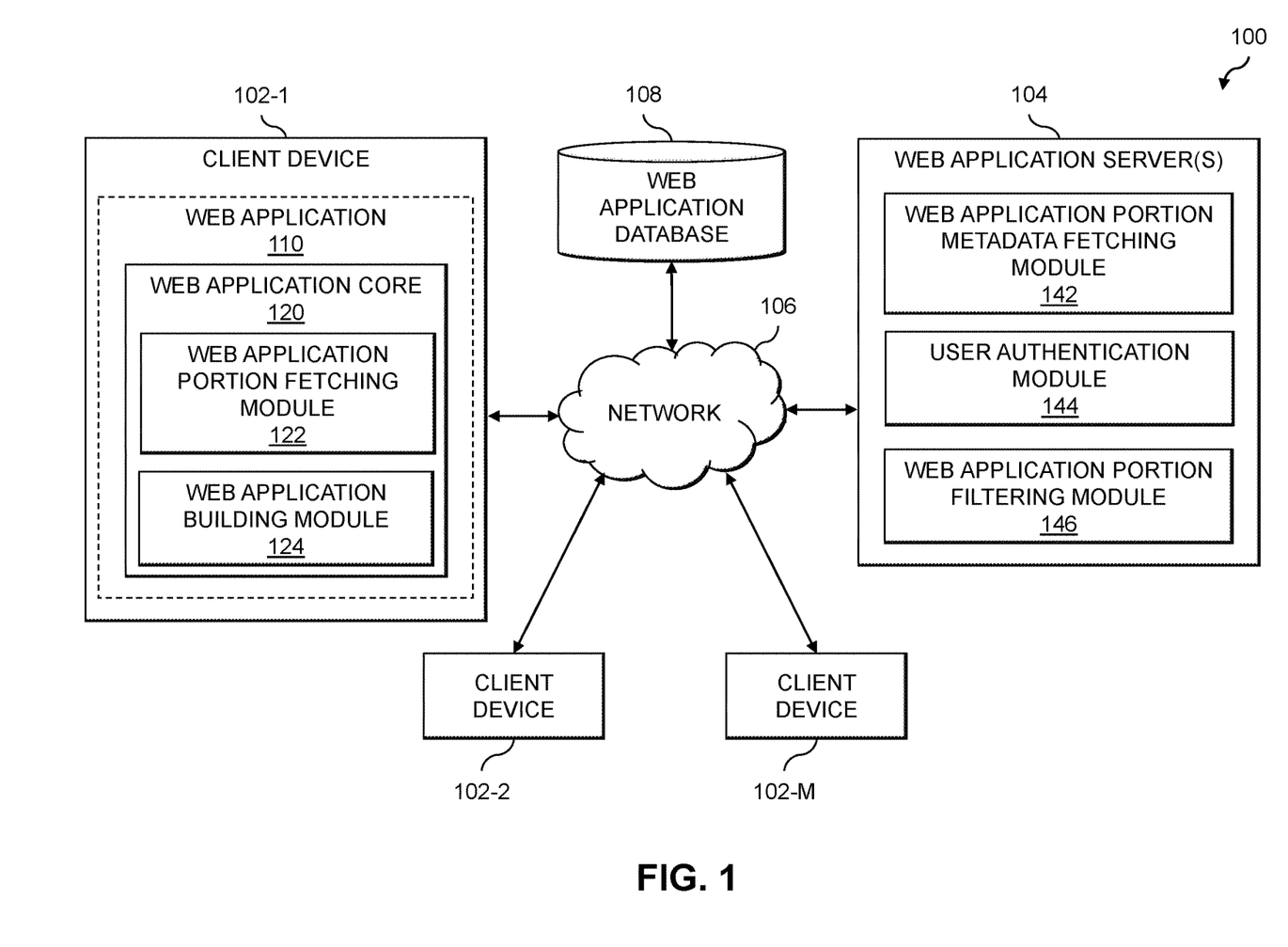
FIG. 1 is a block diagram of an information processing system for enabling access restriction for portions of web applications in a web application in an illustrative embodiment.

FIG. 1 shows an information processing system 100 configured in accordance with an illustrative embodiment. The information processing system 100 is assumed to be built on at least one processing platform and provides functionality for enabling access restriction for portions of web applications. The information processing system 100 includes a set of client devices 102-1, 102-2, . . . 102-M (collectively, client devices 102) and one or more web application servers 104 that are coupled via a network 106. Also coupled to the network 106 is a web application database 108, which is configured to store portions of web applications along with associated metadata that enables seamless access restriction for web applications accessed by the client devices 102.

Each of the client devices 102 is assumed to run a web browser utilized to access one or more web applications hosted by the web application servers 104. For example, client device 102-1 is assumed to access a web application 110 that is hosted by the web application servers 104. As discussed above, web applications may be implemented as application programs designed for delivery to users over a network (e.g., network 106) through a browser interface. The web application 110 may be implemented as a client-server computer program, in which the client runs in a web browser on the client device 102-1 while the application is hosted in the web application servers 104. For clarity of illustration, however, FIG. 1 shows the web application 110 in dashed outline on the client device 102-1 to indicate that a user of the client device 102-1 is accessing the web application 110.

As used herein, a web application portion or web application module refers to a part of a web application that is divided from other parts of the web application. Each web application portion or web application module of a web application is capable of being served by the web application servers 104 to the client devices 102 independently from one another. A particular web application portion or web application module may include one or more pages of the web application, one or more sections of one or more pages of the web application, a set of features of one or more sections or one or more pages of the web application, etc.

The web application servers 104 are entities that serve application code for web applications to the client devices 102. Although FIG. 1 shows a single instance of a web server 104, it should be appreciated that there may be multiple web application servers for a particular web application, where each of the web application servers is configured to serve or otherwise handle a different subset of a plurality of web application portions or web application modules of a particular web application.

As shown in FIG. 1, client device 102-1 runs a web application core 120 (also referred to herein as an application core 120), which is a part of the web application 110 that is initially loaded by the client device 102-1. The application core 120 is configured to fetch web application portions or web application modules from the web application servers 104. This may include, for example, fetching web application portion or web application module definitions and dependencies. The application core 120 is further configured to assemble the web application portions or web application modules into the final web application 110 that a user of the client device 102-1 sees. Although not shown in FIG. 1 for clarity of illustration, the client devices 102-2 through 102-M are assumed to implement respective application cores configured to provide functionality similar to that of application core 120.

Web application portion or web application module metadata refers to the configuration that each web application portion or web application module provides. The web application portion or web application module metadata may include or contain everything that the application core 120 needs to perform its associated functions.

The client devices 102 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The web application database 108, as discussed above, is configured to store and record information relating to web applications. Such information may include, but is not limited to, information relating to the different web application portions or web application modules of one or more web applications, along with associated metadata as described elsewhere herein.

The web application database 108 in some embodiments is implemented using one or more storage systems or devices associated with the web application servers 104. In some embodiments, one or more of the storage systems utilized to implement the web application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102 and web application servers 104, as well as to support communication between the client devices 102, web application severs 104 and other related systems and devices not explicitly shown.

The client devices 102 and web application servers 104 in the FIG. 1 embodiment are assumed to be implemented using at least one processing device. Each such processing device generally comprises at least one processor and an associated memory, and implements one or more functional modules for controlling certain features of the client devices 102 and web application servers 104. In the FIG. 1 embodiment, for example, the application core 120 of the client device 102-1 implements a web application portion fetching module 122 and a web application building module 124, and the web application servers 104 implement a web application portion metadata fetching module 142, a user authentication module 144, and a web application portion filtering module 146.

The web application core 120 on client device 102-1 is configured to receive, from a user, a request to execute a web application 110 that utilizes a plurality of web application portions or modules configured for loading into the web application independent of one another. The web application portion fetching module 122 is configured to send to the web application servers 104 a query for metadata associated with the plurality of web applications portions of web application modules.

The web application portion metadata fetching module 142 of the web application servers 104 is configured to obtain, from the web application database 108, metadata for available web application portions or web application modules. The user authentication module 144 of the web application servers 104 is configured to identify a user of the client device 102-1, and to authenticate or otherwise determine the access rights of the user. The web application portion filtering module 146 of the web application servers 104 is configured to filter the available web application portions or web application modules based on the access rights associated with the user. The web application servers 104 then return to the application core 120 of the client device 102-1 metadata for a subset of the plurality of web application portions or web application modules that the user has access to.

The web application building module 124 of the application core 120 of the client device 102-1 is configured to generate the web application 110 that a user of the client device 102-1 sees by loading instances of the subset of the plurality of web application portions or web application modules at specified locations in one or more pages of the web application 110 based at least in part on the received metadata.

It is to be appreciated that the particular arrangement of the client devices 102, web application servers 104, and web application database 108 illustrated in the FIG. 1 embodiment is presented by way of example only, and alternative arrangements can be used in other embodiments. In some embodiments, for example, the web application database 108 may be implemented at least in part internal to the web application servers 104. As another example, the functionality associated with the web application portion fetching module 122, the web application building module 124, the web application portion fetching module 142, the user authentication module 144 and the web application portion filtering module 146 may be combined into fewer modules, or separated across more modules with the multiple modules possibly being implemented with multiple distinct processors or processing devices.

At least portions of the web application portion fetching module 122, the web application building module 124, the web application portion fetching module 142, the user authentication module 144 and the web application portion filtering module 146 may be implemented at least in part in the form of software that is stored in memory and executed by a processor.

It is to be understood that the particular set of elements shown in FIG. 1 for enabling access restriction for portions of web applications is presented by way of illustrative example only, and in other embodiments additional or alternative elements may be used. Thus, another embodiment may include additional or alternative systems, devices and other network entities, as well as different arrangements of modules and other components.

The client devices 102, web application servers 104 and other portions of the system 100 may be part of cloud infrastructure as will be described in further detail below. The cloud infrastructure hosting one or more of the client devices 102 may also host one or more of the web application servers 104.

The client devices 102, web application servers 104 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 102, web application servers 104, and web application database 108, or components thereof, may be implemented on respective distinct processing platforms, although numerous other arrangements are possible. For example, in some embodiments at least portions of the web application servers 104 and web application database 108 are implemented on the same processing platform. The web application database 108 can therefore be implemented at least in part within at least one processing platform that implements at least a portion of the web application servers 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, web application severs 104, and web application database 108, or portions or components thereof, to reside in different data centers. Numerous other distributed implementations are possible. The client devices 102, web application servers 104, and web application database 108 or portions thereof can also be implemented in a distributed manner across multiple data centers.

Additional examples of processing platforms utilized to implement the client devices 102, web application servers 104 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

Figure 2:
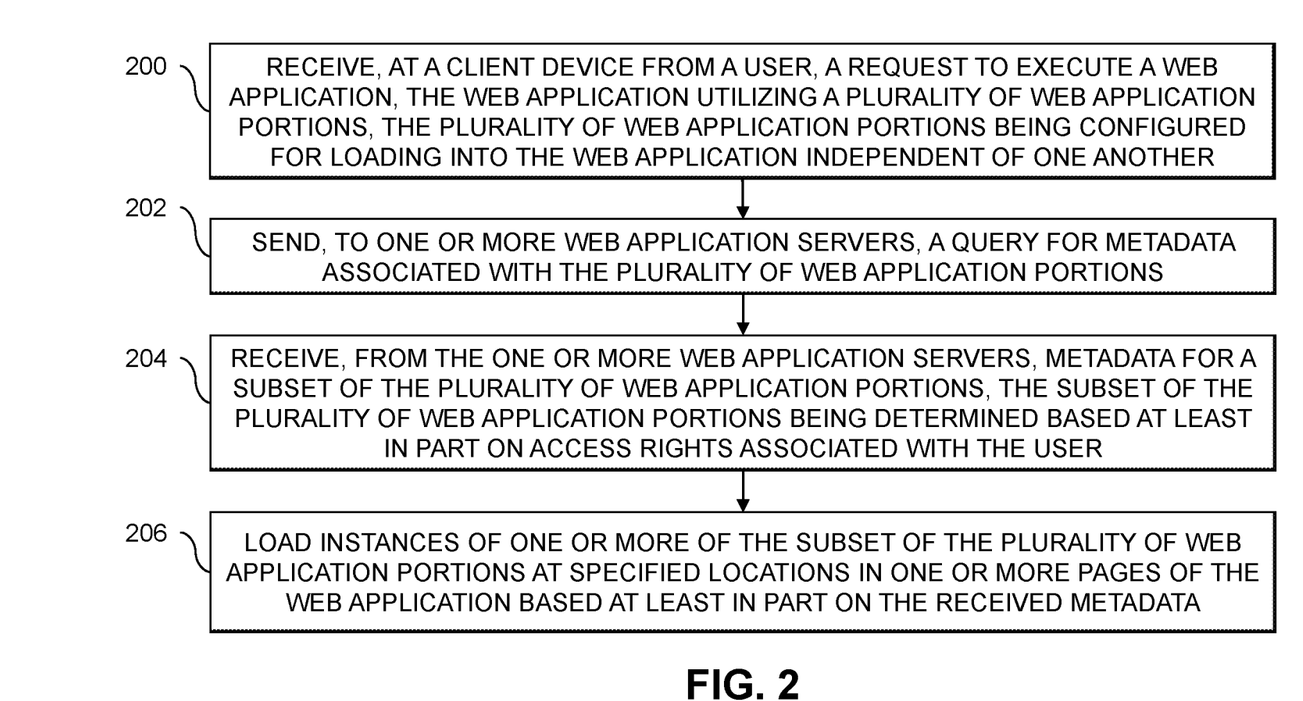
FIG. 2 is a flow diagram of an exemplary process for access restriction for portions of web applications in an illustrative embodiment.

An exemplary process for enabling access restriction for portions of web applications for web applications will now be described in more detail with reference to the flow diagram of FIG. 2. It is to be understood that this particular process is only an example, and that additional or alternative processes for enabling access restriction for portions of web applications may be used in other embodiments.

In this embodiment, the process includes steps 200 through 206. These steps are assumed to be performed by the client device 102-1 (e.g., utilizing the application core 120, web application portion fetching module 122, and web application building module 124) and the web application servers 104 (e.g., utilizing the web application portion metadata fetching module 142, the user authentication module 144 and the web application portion filtering module 146). The process begins with step 200, receiving, at a client device (e.g., client device 102-1) from a user thereof, a request to execute a web application (e.g., web application 110). The web application utilizes a plurality of web application portions, where the plurality of web application portions are configured for loading into the web application independent of one another. Each of the web application portions may comprise at least one of: one or more pages of the web application; one or more sections of at least one of the one or more pages of the web application; a set of features of at least one of the one or more pages of the web application; etc. The web application may comprise a modular architecture that defines the plurality of web application portions prior to building the web application. The plurality of web application portions may be defined based at least in part on uniform resource locator (URL)-accessible portions of the web application. The plurality of web application portions may also or alternatively be defined at build time of the web application by injecting code into a packaging system utilized to build the web application.

In step 202, the client device (e.g., via an application core such as application core 120) sends to one or more web application servers (e.g., web application servers 104) a query for metadata associated with the plurality of web application portions of the web application. The metadata for a given one of the web application portions may comprise a configuration of the given web application portion, where the configuration comprises one or more of: a name of the given web application portion; access rights for the given web application portion; a name of a given bundle of web application portions including the given web application portion; one or more dependencies for external libraries not included in the given bundle of web application portions; an injection location in at least one of the one or more pages of the web application; a navigation configuration for (i) dynamically loading visuals of the given web application portion in the web application, (ii) routing to the given web application portion from one or more other ones of the plurality of web application portions and (iii) routing from the given web application portion to one or more other ones of the plurality of web application portions; etc.

In step 204, the client device (e.g., the application core running thereon) receives from the one or more web application servers metadata for a subset of the plurality of web application portions. The subset of the plurality of web application portions are determined based at least in part on access rights associated with the user (e.g., the subset of the plurality of web application portions are those that the user of the client device is entitled to access). The client device (e.g., the application core running thereon) in step 206 loads instances of one or more of the subset of the plurality of web application portions at specified locations in one or more pages of the web application based at least in part on the received metadata. Step 206 may include building a navigation configuration for the web application based at least in part on the received metadata, wherein loading instances of one or more of the subset of the plurality of web application portions is based at least in part on the navigation configuration for the web application.

Web applications may be configured to implement access restriction in various ways. In a single-page web application, for example, users can access parts of the single-page web application or get different web elements and visuals based on the users' roles, rights and restrictions. All of the code for the web application may be downloaded to clients associated with different users, where the clients are responsible for implementing checks at multiple locations, including navigation guards within the web application, to prevent the users from visiting restricted pages (e.g., preventing a given user from accessing a page which the given user is not permitted to view based on the given user's roles, rights and restrictions). When large portions of the web application are restricted, such an arrangement can result in a degraded user experience for certain users due to the large amount of code that needs to be downloaded but which is never used as a result of the roles, rights and restrictions associated with such users.

To handle access rights, a web application may define navigation guards inside the core application routing to prevent users from navigating to different areas of the web application. A major drawback of this approach, however, is that the routing for each web application portion or web application module needs to be known by the application core, which is difficult to maintain. Thus, each web application portion or web application module needs to be at least partially downloaded, including associated dependencies. This increases the initial loading time of the web application as well as the memory consumption of the web application. In illustrative embodiments, the code for each web application portion or web application module is simplified by removing the need for coding access rights into each web application portion of web application module, or for hard-coding a web application portion or web application module requirements into the application core itself (which is both less flexible and more difficult to maintain). Access restriction is instead applied server-side, and the client-side application core only needs to download those web application portions or web application modules (and associated dependencies) that a user has access to.

Some server-side techniques for access restriction rely on direct code manipulation by the web application servers, which has the drawback of impacting server resources (e.g., processor and memory utilization) while preventing any sort of caching by the client-side web browser. A bundle of web application portions or web application modules may be quite large in size, so this impact is noticeable. In some embodiments, the web application portion or web application module metadata is not cached. However, as the web application portion or web application module metadata is quite small this has little to no impact on performance. The rest of the web application portion or web application module bundle (e.g., actual JavaScript, hypertext markup language (HTML), cascading style sheets (CSS) code, etc.) can be cached by the client-side web browser.

As web applications continue to grow in size and complexity and as technology improves, web applications are starting to become more modular. This is a result of various advancements, including through the use of packaging systems that are smart enough to provide compile-time partial modularity for monolithic applications, though the use of micro-frontends web applications that are architectured in a modular way relying on standalone portions modules to compose themselves, etc.

Illustrative embodiments provide techniques for enabling a web application to restrict pages or portions of pages (e.g., web application portions or web application modules) to specific users (e.g., based on roles and other attributes) while not affecting users that do not have access to such pages or portions of pages. To do so, some embodiments leverage a modular web application architecture whereby web application portions or web application modules register themselves to the core application through configurations provided by one or more web application servers which are aware of user access rights and can apply them to the web application portion or web application module configuration. In this way, the web application servers only serve web application portions or web application modules to an application core that a user has access to. The application core itself is not required to be aware of the web application portions or web application modules that the user is restricted from accessing.

Such arrangements provide a number of advantages, including eliminating download overhead as the application core only downloads the portions of a web application that the user actually needs, rather than downloading all web application content even when the user is restricted from accessing a portion of the web application content. This reduces overall network congestion and bandwidth utilization. Further, web application performance is improved due to reduced loading time and reduced memory utilization. Another advantage is that there are no side effects on the resulting web application, such as side effects due to libraries and/or dependencies that could have global side effects. Portions or modules of the web application are also more easily configured, as there is no need for code on plugins or core code changes required when adding portions or modules. There is easier maintenance of the web application overall as well, as checks need to be performed in very specific and limited locations only.

Defining access rights and navigation guards, and otherwise restricting users from seeing parts of a web application that they should not see is a challenging task. While various embodiments are described below in the context of a web application with a modular architecture, it should be appreciated that the techniques described herein may also be applied for monolithic web applications that are modularized at build time.

As micro-frontends are rising in popularity and major modern web application frameworks are putting significant effort into reducing their footprint through tree shaking and other techniques, modular web application architectures are becoming more prevalent. As discussed above, access restriction in web applications may require an end-user to download more content than necessary. Further, access restriction can quickly become complex to maintain client-side due to the amount of checks and code that needs to be specified to handle access rights.

Some embodiments provide a configuration-based access restriction setup that is easy to write and easy to maintain, and which utilizes isolated independent web application portions or web application modules. Advantageously, no actual code is required within the different web application portions or web application modules, or within the application core, to handle access rights and how the web application portions or web application modules integrate within the global web application. Being code-independent allows the use of different web application frameworks for different web application portions or web application modules in the same web application. Code independence also allows for easier maintenance and updates on how rights are handled (e.g., due to access restrictions being handled at one location on the web application servers) and allows for proactive application trimming before sending any content to the end-user.

Figure 3:
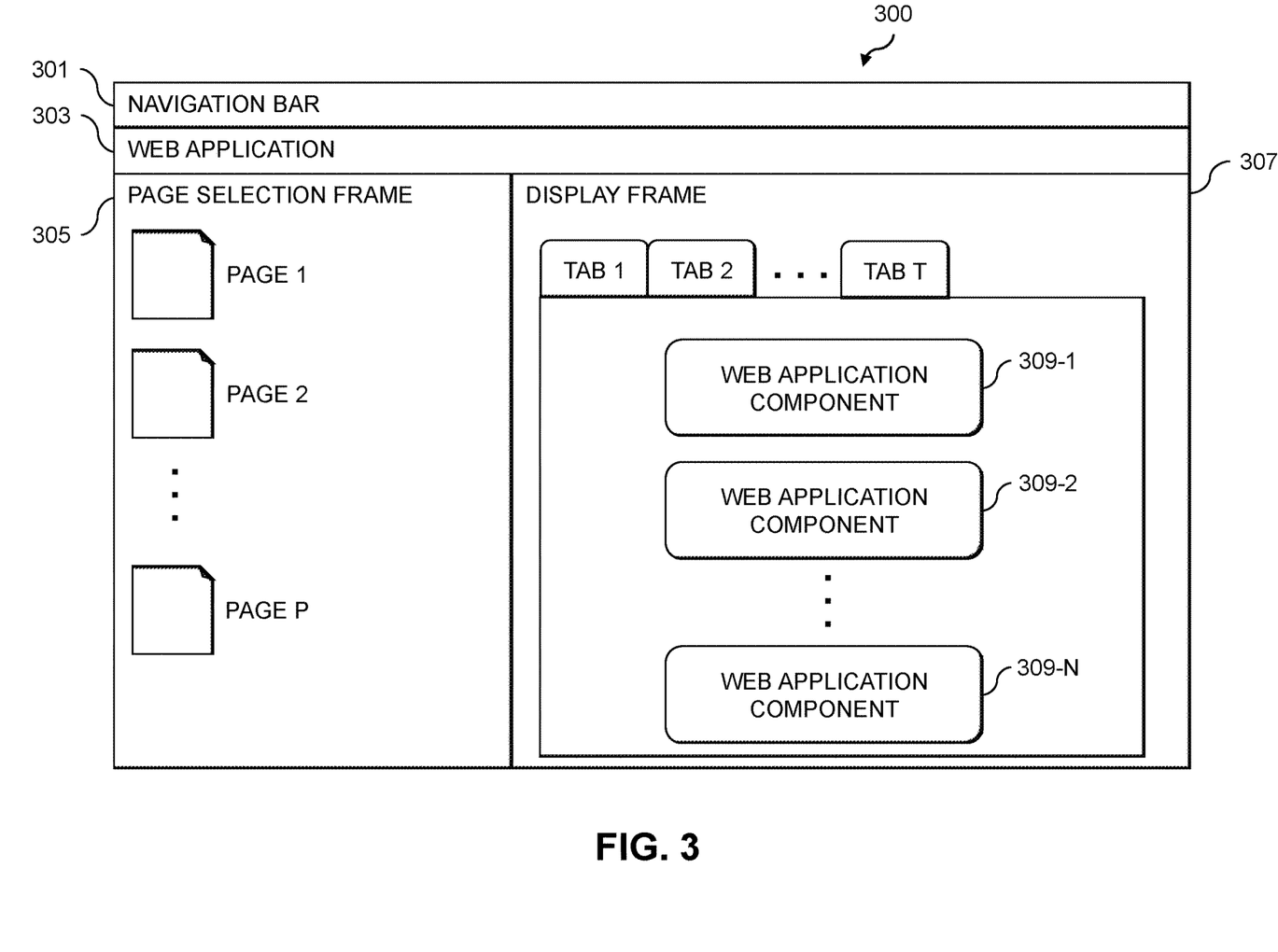
FIG. 3 illustrates a view of different portions of a web application in an illustrative embodiment.

FIG. 3 shows an example layout 300 of a web application 303 that utilizes a modular architecture. The layout 300 includes a navigation bar 301, which may be a portion of a web browser that is utilized to type in or otherwise input uniform resource locators (URLs) to load the web application 303. The web application 303 also includes a page selection frame 305, allowing a user to select from pages 1, 2, . . . P to present in the display frame 307. The display frame 307 as shown includes a set of tabs 1, 2, . . . T. When a particular page and tab are selected (e.g., page 1, tab 1) that page or tab gets loaded into the display frame 307, along with a set of web application components 309-1, 309-2, . . . 309-N (collectively, components 309). The web application components 309 may comprise charts, plots, tables, visualizations, widgets, or other elements of the web application 303.

Different ones or sets of the web application components 309 (or different ones or sets of the pages or tabs of the web application 303) are assumed to be associated with different web application portions or web application modules. Each web application component 309 on a given page of the web application 303, for example, may be associated with a different web application portion or web application module configured to be served independently of one another. Alternatively, two or more of the web application components 309 (e.g., web application components 309-1 and 309-2) may be associated with a first web application portion or web application module and other ones of the web application components 309 (e.g., web application components 309-3 through 309-N) are associated with a second web application portion or web application module, where the first and second web application portions or web application modules are configured to be served independently of one another. The modular architecture of the web application 303, however, is not limited to having different web application components 309 in different web application portions or web application modules. In other embodiments, each tab (or different groups of tabs) of a given page of the web application 303 is associated with different web application portions or web application modules configured to be served independently of one another. Similarly, each page (or different groups of pages) of the web application 303 may be associated with different web application portions or web application modules configured to be served independently of one another.

It is assumed that the web application 303 is divided into different web application portions or web application modules. This may be performed before developing the web application 303, but can also be done after the fact on an existing web application if needed. Some packaging systems, for example, can divide the web application 303 at build time by injecting specific code into the packaging system's loader. While it is generally advantageous to use a modular architecture upfront, this is not a requirement. The modular architecture in some embodiments utilizes micro-frontends. The modular architecture, however, may also use routing to split the web application 303. For example, the web application 303 may be divided or split into different web application portions or web application modules based on uniform resource locater (URL)-accessible pages thereof.

Figure 4:
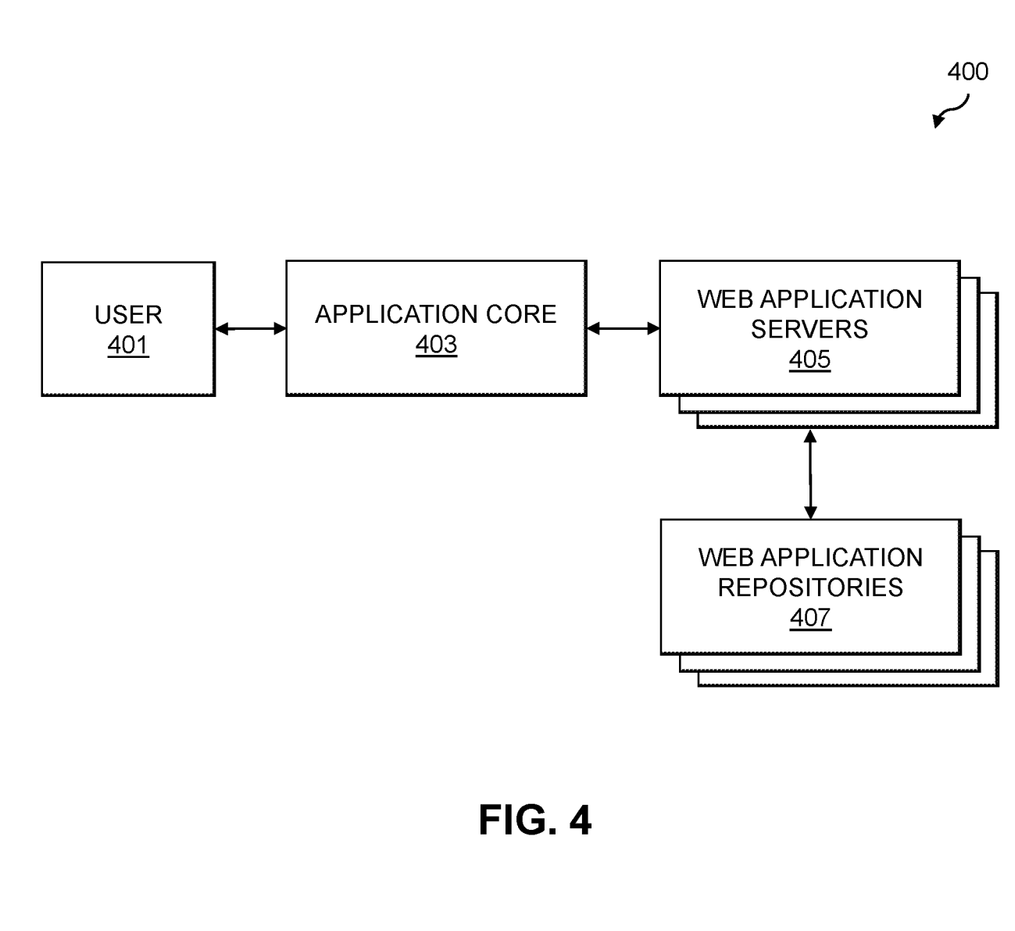
FIG. 4 shows a system for access restriction enforcement for web applications in an illustrative embodiment.

FIG. 4 shows a system 400 for web application portion or web application module access restriction in a web application such as web application 303. The system 400 includes a user 401 (e.g., a web browser running on one of client devices 102) that interacts with an application core 403 of a web application to navigate between different pages of the web application. The application core 403 is configured to load (e.g., open and display) and unload (e.g., change) pages of the web application in response to user requests. To do so, the application core 403 queries the one or more web application servers 405 to fetch metadata for different web application portions or web application modules. Each of the web application servers 405 reads metadata for the web application portions or web application modules it knows about or is otherwise responsible for serving from an associated web application portion or web application module repository 407.

In some embodiments, a metadata schema is created to cover all options that web application portions or web application modules would require for loading purposes. The metadata schema may include, but is not limited to: web application portion or web application module name; web application portion or web application module restrictions (e.g., access rights); web application portion or web application module bundle name; web application portion or web application module dependencies (e.g., utilizing identifiers for external libraries that are not included into the associated web application portion or web application module bundle); operational web application portion or web application module injection location; and operational web application portion or web application module navigation configuration (e.g., in order to build the web application navigation dynamically, both in terms of visuals and routing).

Figure 5A:
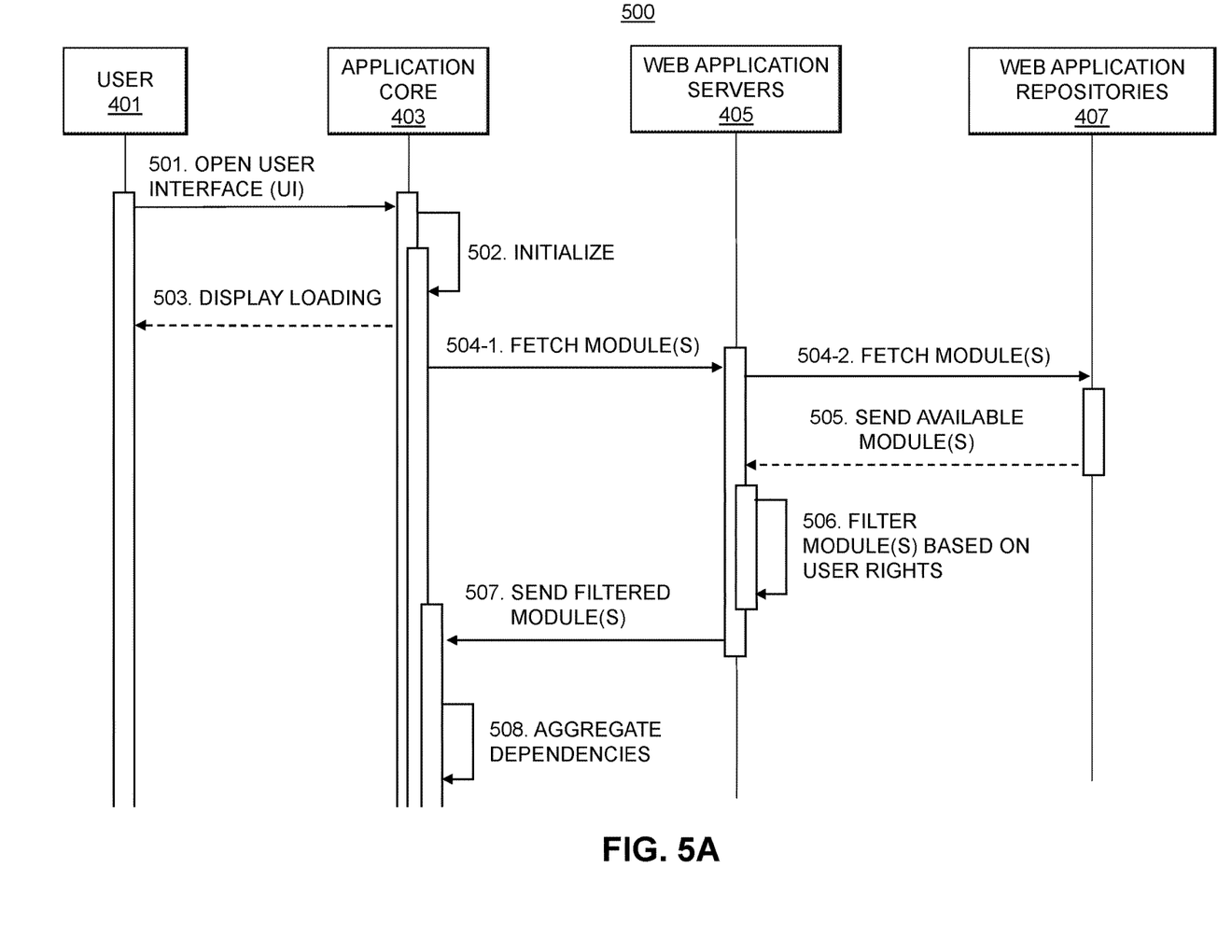
FIGS. 5A and 5B show a system flow for access restriction enforcement for web applications in an illustrative embodiment.
Figure 5B:
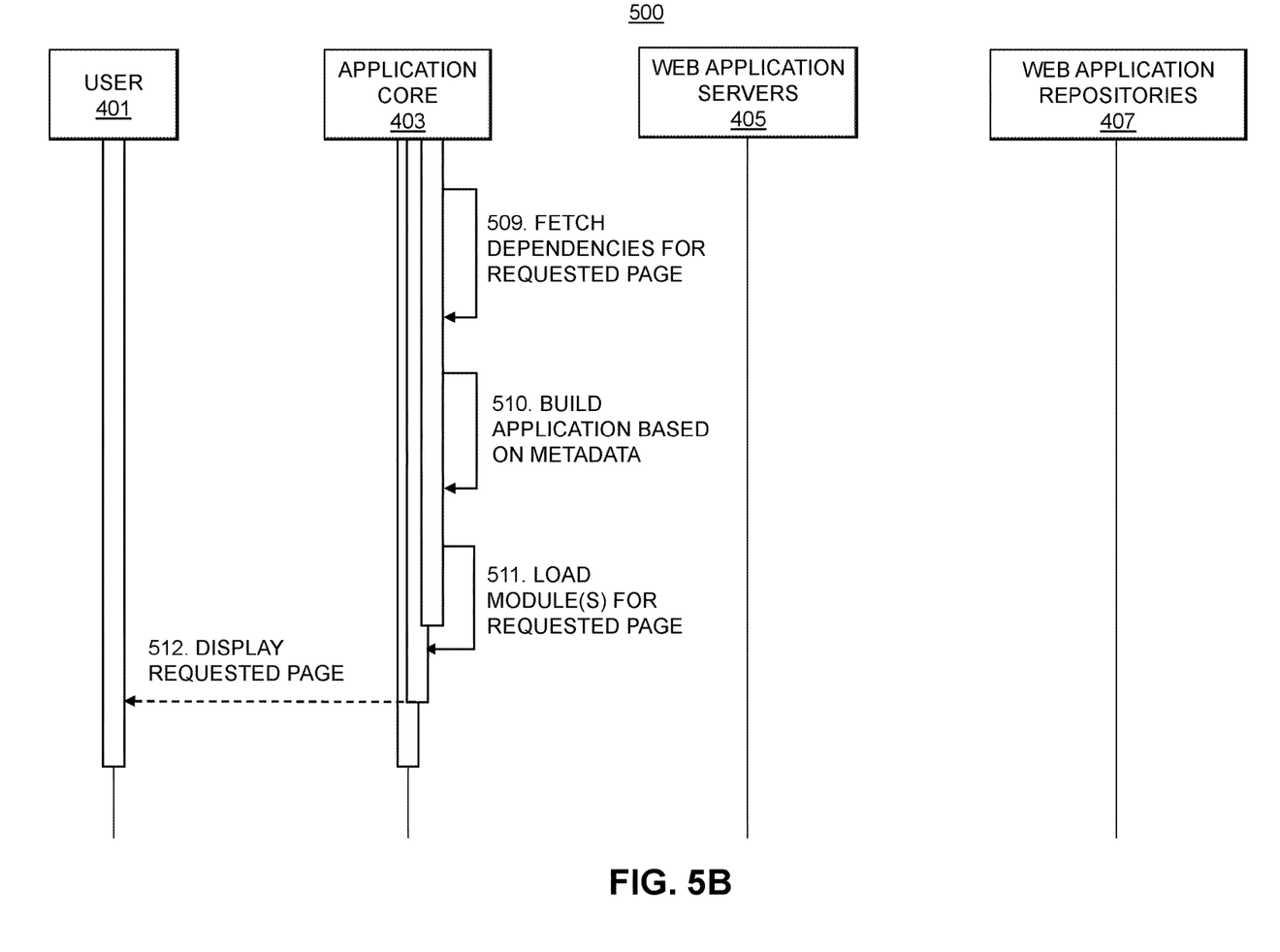

A process flow 500 for web application portion or web application module access restriction in a web application utilizing the system 400 will now be described with respect to FIGS. 5A and 5B. The process flow 500 begins with step 501, where the user 401 initially loads or opens the user interface (UI) of a web application (e.g., which may include a request to open a particular page of the web application). The application core 403 receives the request, and initializes in step 502 to fetch web application portions or web application modules needed to satisfy the request. The application core 403 also displays loading feedback to the user 401 in step 503. In step 504-1, the application core 403 queries the one or more web application servers 405 to fetch web application portion or web application module metadata. Each of the web application servers 405 in step 504-2 reads metadata for the web application portions or web application modules it knows about or handles from its associated web application portion or web application module repository 407. The web application portion or web application module repositories 407 send metadata for available web application portions or web application modules back to the web application servers 405 in step 505.

The web application servers 405 in step 506 filter the available web application portions or web application modules based on user rights of the user 401. The web application servers 405 thus implement access checks based on the identity or role(s) of the user 401. This may be accomplished, for example, utilizing single sign-on (SSO) or other authentication mechanisms such that the web application servers 405 are able to determine which of the web application portions or web application modules of the web application (or a requested page or other portion thereof from the step 501 request) the user 401 is entitled to access. The web application servers 405 filter the available web application portions or web application modules received from the web application module repositories 407 in step 506 and discard the web application portions or web application modules that the user 401 does not have access to. The web application servers 405 in step 507 send to the application core 403 the filtered list of web application portions or web application modules that the user 401 can access. This may include, for example, providing web application portion or web application module metadata for the web application portions or web application modules that the user 401 is permitted to access.

The application core 403 then proceeds to build the web application routing and navigation based on the received web application portion or web application module metadata. This includes aggregating dependencies across the web application portions or web application modules in step 508, fetching the common dependencies for the requested page of the web application in step 509, and building the web application based on the metadata for the web application portions or web application modules in step 510. The application core 403 loads web application portions or web application modules as needed for the requested page of the web application in step 511 based on their associated metadata configuration. The application core 403 then displays the requested page of the web application to the user 401 in step 512.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for enabling access restriction for portions of web applications will now be described in greater detail with reference to FIGS. 6 and 7. Although described in the context of system 100, these platforms may also be used to implement at least portions of other information processing systems in other embodiments.

Figure 6:
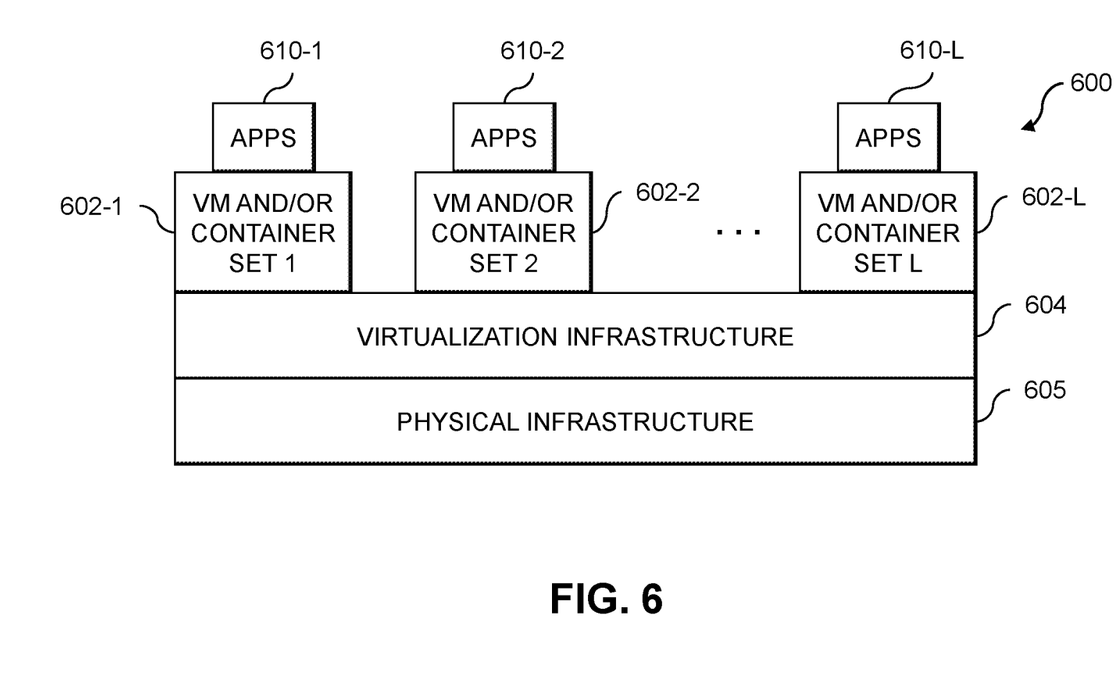
FIGS. 6 and 7 show examples of processing platforms that may be utilized to implement at least a portion of an information processing system in illustrative embodiments.
Figure 7:
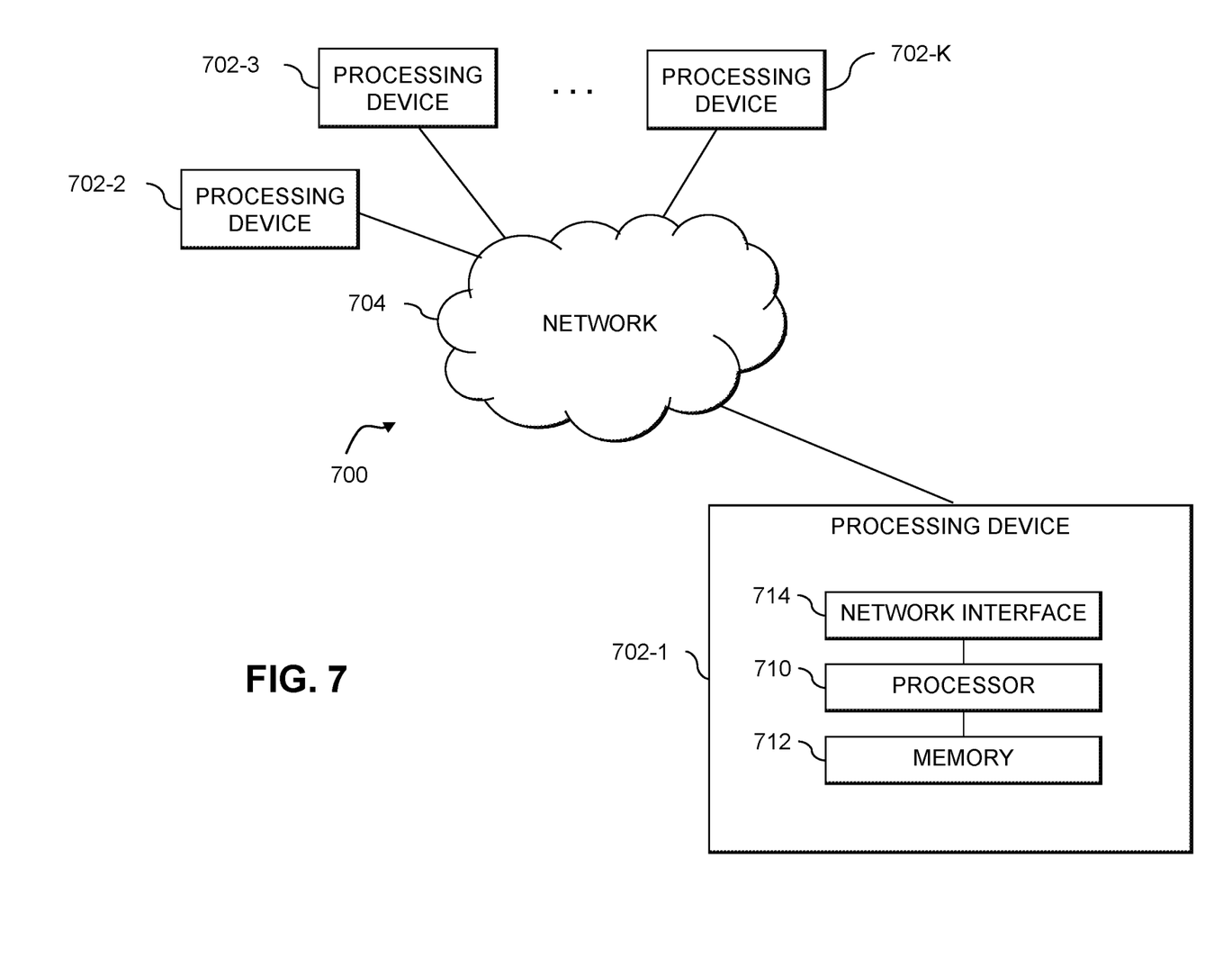

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for enabling access restriction for portions of web applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, web application portions, configuration metadata, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      receiving, from a user, a request to execute a web application, the web application utilizing a plurality of web application portions, the plurality of web application portions being configured for loading into the web application independent of one another;
      sending, to two or more web application servers, at least one query for metadata associated with the plurality of web application portions, a first one of the two or more web application servers being responsible for serving to the user at least a first subset of the plurality of web application portions comprising software code written utilizing a first web application software framework, a second one of the two or more web application servers being responsible for serving to the user at least a second subset of the plurality of web application portions comprising software code written utilizing a second web application software framework, the first web application software framework comprising a first set of common libraries and application functions, the second web application software framework comprising a second set of common libraries and application functions different than the first set of common libraries and application functions;
      receiving, from the first web application server, first metadata comprising configuration information for one or more of the first subset of the plurality of web application portions that the user is permitted to access;
      receiving, from the second web application server, second metadata comprising configuration information for one or more of the second subset of the plurality of web application portions that the user is permitted to access; and
      loading instances of one or more of the plurality of web application portions at specified locations in one or more pages of the web application based at least in part on the configuration information in the first and second metadata.

2. The apparatus of claim 1 wherein a given one of the plurality of web application portions comprises at least one of the one or more pages of the web application.

3. The apparatus of claim 1 wherein a given one of the plurality of web application portions comprises one or more sections of at least one of the one or more pages of the web application.

4. The apparatus of claim 1 wherein a given one of the plurality of web application portions comprises a set of features of at least one of the one or more pages of the web application.

5. The apparatus of claim 1 wherein the configuration information in at least one of the first and second metadata for a given one of the plurality of web application portions comprises a name of the given web application portion and access rights for the given web application portion.

6. The apparatus of claim 1 wherein the configuration information in at least one of the first and second metadata for a given one of the plurality of web application portions comprises (i) a name of a given bundle of web application portions including the given web application portion and (ii) one or more dependencies for external libraries not included in the given bundle of web application portions.

7. The apparatus of claim 1 wherein the configuration information in at least one of the first and second metadata for a given one of the plurality of web application portions comprises an injection location of the given web application portion in at least one of the one or more pages of the web application.

8. The apparatus of claim 1 wherein the configuration information in at least one of the first and second metadata for a given one of the plurality of web application portions comprises a navigation configuration for (i) dynamically loading visuals of the given web application portion in the web application, (ii) routing to the given web application portion from one or more other ones of the plurality of web application portions and (iii) routing from the given web application portion to one or more other ones of the plurality of web application portions.

9. The apparatus of claim 1 wherein the at least one processing device is further configured to build a navigation configuration for the web application based at least in part on the first and second metadata.

10. The apparatus of claim 9 wherein loading instances of one or more of the plurality of web application portions is based at least in part on the navigation configuration for the web application.

11. The apparatus of claim 1 wherein the web application comprises a modular architecture that defines the plurality of web application portions prior to building the web application.

12. The apparatus of claim 1 wherein the plurality of web application portions are defined based at least in part on uniform resource locator (URL)-accessible portions of the web application.

13. The apparatus of claim 1 wherein the plurality of web application portions are defined at build time of the web application by injecting code into a packaging system utilized to build the web application.

14. A computer program product comprising a non-transitory processor-readable storage medium having stored therein program code of one or more software programs, wherein the program code when executed by at least one processing device causes the at least one processing device to perform steps of:
receiving, from a user, a request to execute a web application, the web application utilizing a plurality of web application portions, the plurality of web application portions being configured for loading into the web application independent of one another;
sending, to two or more web application servers, at least one query for metadata associated with the plurality of web application portions, a first one of the two or more web application servers being responsible for serving to the user at least a first subset of the plurality of web application portions comprising software code written utilizing a first web application software framework, a second one of the two or more web application servers being responsible for serving to the user at least a second subset of the plurality of web application portions comprising software code written utilizing a second web application software framework, the first web application software framework comprising a first set of common libraries and application functions, the second web application software framework comprising a second set of common libraries and application functions different than the first set of common libraries and application functions;
receiving, from the first web application server, first metadata comprising configuration information for one or more of the first subset of the plurality of web application portions that the user is permitted to access;
receiving, from the second web application server, second metadata comprising configuration information for one or more of the second subset of the plurality of web application portions that the user is permitted to access; and
loading instances of one or more of the plurality of web application portions at specified locations in one or more pages of the web application based at least in part on the configuration information in the first and second metadata.

15. The computer program product of claim 14 wherein a given one of the plurality of web application portions comprises one of:
at least one of the one or more pages of the web application;
one or more sections of at least one of the one or more pages of the web application; and
a set of features of at least one of the one or more pages of the web application.

16. The computer program product of claim 14 wherein the configuration information in at least one of the first and second metadata for a given one of the plurality of web application portions comprises:
a name of the given web application portion;
access rights for the given web application portion;
a name of a given bundle of web application portions including the given web application portion;
one or more dependencies for external libraries not included in the given bundle of web application portions;
an injection location in at least one of the one or more pages of the web application; and
a navigation configuration for (i) dynamically loading visuals of the given web application portion in the web application, (ii) routing to the given web application portion from one or more other ones of the plurality of web application portions and (iii) routing from the given web application portion to one or more other ones of the plurality of web application portions.

17. A method comprising steps of:
receiving, from a user, a request to execute a web application, the web application utilizing a plurality of web application portions, the plurality of web application portions being configured for loading into the web application independent of one another;
sending, to two or more web application servers, at least one query for metadata associated with the plurality of web application portions, a first one of the two or more web application servers being responsible for serving to the user at least a first subset of the plurality of web application portions comprising software code written utilizing a first web application software framework, a second one of the two or more web application servers being responsible for serving to the user at least a second subset of the plurality of web application portions comprising software code written utilizing a second web application software framework, the first web application software framework comprising a first set of common libraries and application functions, the second web application software framework comprising a second set of common libraries and application functions different than the first set of common libraries and application functions;

receiving, from the first web application server, first metadata comprising configuration information for one or more of the first subset of the plurality of web application portions that the user is permitted to access;

receiving, from the second web application server, second metadata comprising configuration information for one or more of the second subset of the plurality of web application portions that the user is permitted to access; and loading instances of one or more of the plurality of web application portions at specified locations in one or more pages of the web application based at least in part on the configuration information in the first and second metadata;

wherein the method is performed by at least one processing device comprising a processor coupled to a memory.

18. The method of claim 17 wherein a given one of the plurality of web application portions comprises one of:

at least one of the one or more pages of the web application;

one or more sections of at least one of the one or more pages of the web application; and a set of features of at least one of the one or more pages of the web application.

19. The method of claim 17 wherein the configuration information in at least one of the first and second metadata for a given one of the plurality of web application portions comprises:

a name of the given web application portion;

access rights for the given web application portion;

a name of a given bundle of web application portions including the given web application portion;

one or more dependencies for external libraries not included in the given bundle of web application portions;

an injection location in at least one of the one or more pages of the web application; and a navigation configuration for (i) dynamically loading visuals of the given web application portion in the web application, (ii) routing to the given web application portion from one or more other ones of the plurality of web application portions and (iii) routing from the given web application portion to one or more other ones of the plurality of web application portions.

20. The apparatus of claim 1 wherein the first subset of the plurality of web application portions that utilize the first web application software framework and the second subset of the plurality of web application portions that utilize the second web application software framework are configured for loading independent of one another in a same one of the one or more pages of the web application.

* * * * *